(12) United States Patent
Tsai et al.

(10) Patent No.: US 9,836,869 B2
(45) Date of Patent: Dec. 5, 2017

(54) GRAPHICS-PROCESSING METHOD OF A GRAPHICS-PROCESSING UNIT AND GRAPHICS-PROCESSING APPARATUS

(71) Applicant: MediaTek Inc., Hsin-Chu (TW)

(72) Inventors: Sung-Fang Tsai, Hsinchu (TW); Pei-Kuei Tsung, New Taipei (TW); Ming-Hao Liao, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 89 days.

(21) Appl. No.: 15/075,050

(22) Filed: Mar. 18, 2016

(65) Prior Publication Data

US 2016/0379337 A1 Dec. 29, 2016

Related U.S. Application Data (60) Provisional application No. 62/183,257, filed on Jun. 23, 2015.

(51) Int. Cl.
*G06T 15/00* (2011.01)
*G06T 11/40* (2006.01)

(52) U.S. Cl.
CPC ............ *G06T 15/005* (2013.01); *G06T 11/40* (2013.01)

(58) Field of Classification Search
CPC ............................. G06T 11/40; G06T 15/005
USPC .......................................................... 345/419
See application file for complete search history.

(56) References Cited

U.S. PATENT DOCUMENTS

| 8,692,848 | B2 | 4/2014 | Adams et al. |
| 8,830,246 | B2 | 9/2014 | Seetharamaiah et al. |
| 8,952,962 | B2 | 2/2015 | Son et al. |
| 2010/0177105 | A1 | 7/2010 | Nystad et al. |
| 2013/0135322 | A1 | 5/2013 | Seetharamaiah et al. |

FOREIGN PATENT DOCUMENTS

EP 2 317 479 5/2011

OTHER PUBLICATIONS

Antochi, I., et al.; "Memory Bandwidth Requirements of Tile-Based Rendering;" Jan. 2014; pp. 323-332.

*Primary Examiner* — Jacinta M Crawford
(74) *Attorney, Agent, or Firm* — McClure, Qualey & Rodack, LLP (57) ABSTRACT

A graphics-processing method and a graphics-processing apparatus are provided. The graphics-processing method includes the steps of computing a vertex position of a vertex in a binning phase to obtain a first position data; generating a first signal according to a first condition, wherein when the first signal corresponds to a first value, the first position data is stored into a memory unit, and when the first signal corresponds to a second value, the vertex position of the vertex in a rendering phase is computed to obtain a second position data; computing a vertex varying of the vertex in the binning phase or the rendering phase; and rendering in the rendering phase according to either the first position data or the second position data.

20 Claims, 9 Drawing Sheets

GRAPHICS-PROCESSING METHOD OF A GRAPHICS-PROCESSING UNIT AND GRAPHICS-PROCESSING APPARATUS

CROSS REFERENCE TO RELATED APPLICATIONS

This application claims the benefit of U.S. Provisional Application No. 62/183,257, filed on Jun. 23, 2015, the entirety of which is/are incorporated by reference herein.

This application is related to co-pending and commonly assigned U.S. patent application Ser. No. 14/675,759, filed on Apr. 1, 2015, entitled "GRAPHICS PROCESSING METHOD AND GRAPHICS PROCESSING APPARATUS", which application is hereby incorporated by reference in its entirety.

BACKGROUND OF THE INVENTION

Field of the Invention

The invention generally relates to a graphics-processing method of a graphics-processing unit (GPU), and more particularly, to determining whether to re-compute a vertex position of a vertex in a rendering phase according to a checking result.

Description of the Related Art

A conventional portable electronic device such as a conventional mobile phone may have a processor (e.g. a central processing unit (CPU)) to control the operations of the conventional portable electronic device. It may also have a conventional GPU to perform graphics-related calculations. According to the related art, the conventional GPU is suitable for conventional immediate-rendering technologies or conventional tile-based rendering (TBR) technologies.

When the conventional GPU performs graphics-related calculations, the conventional GPU may only compute the vertex position of the vertex in the binning phase to obtain position data and then store the position data in the memory unit. Therefore, the memory bandwidth may be wasted in the binning phase.

Therefore, avoiding above problem is a subject worthy of discussion for saving memory usage and bandwidth.

BRIEF SUMMARY OF THE INVENTION

Graphics-processing methods of a graphics-processing unit (GPU) and graphics-processing apparatus are provided to overcome the problems mentioned above.

An embodiment of the invention provides a graphics-processing method of a graphics-processing unit (GPU). The graphics-processing method comprises the steps of computing the vertex position of a vertex in a binning phase to obtain a first position data; generating a first signal according to a first condition, wherein when the first signal corresponds to a first value, the first position data is stored into a memory unit, and when the first signal corresponds to a second value, the vertex position of the vertex in a rendering phase is computed to obtain a second position data; computing a vertex varying of the vertex in the binning phase or the rendering phase; and rendering in the rendering phase according to the first position data or the second position data, wherein when the first signal corresponds to the first value, the rendering is according to the first position data, and wherein when the first signal corresponds to the second value, the rendering is according to the second position data.

In the embodiment of the invention, the graphics-processing method further comprises the steps of generating a second signal according to a second condition, wherein when the second signal corresponds to a third value computing the vertex varying of the vertex is in the binning phase, and wherein when the second signal corresponds to a fourth value, computing the vertex varying of the vertex is in the rendering phase.

In the embodiment of the invention, the graphics-processing method further comprises the steps of choosing to process with respect to the vertex in one of the following ways according to a third condition. The ways comprise computing the varying of the vertex and storing the varying of the vertex in the rendering phase; computing the varying of the vertex and not storing the varying of the vertex in the rendering phase; and bypass-computing the varying of the vertex.

In the embodiment of the invention, the first condition, second condition and third condition of the graphics-processing method is input component count, output component count, primitive bounding box, primitive type, previous decision result from the same tile and same draw call, later shader stage decision, state counter from non-shader function part in GPU, memory requirement from complier, bandwidth profiling and usage information, system-level status and requirement, utilization profiling information from execution unit, power/heat index from power estimator, stored profiling data for the same program, hint sent from CPU, instancing setting, tessellation setting and parameters, geometry shader information, draw call vertex number, draw call bounding box, on-chip buffer size, input data correlation between shader stages, or external buffer usage.

An embodiment of the invention provides a graphics-processing apparatus. The graphics-processing apparatus comprises at least one vertex shader, a first checking unit, and a rending unit. The at least one vertex shader is configured to compute a vertex position of a vertex in a binning phase to obtain a first position data and compute a vertex varying of the vertex in the binning phase or the rendering phase. The first checking unit is configured to generate a first signal according to a first condition, wherein when the first signal corresponds to a first value, the first position data is stored into a memory unit, and when the first signal corresponds to a second value, the vertex position of the vertex in a rendering phase is computed to obtain a second position data. The rending unit is configured to render in the rendering phase according to either the first position data or the second position data, wherein when the first signal corresponds to the first value, the rending unit processes rendering according to the first position data, and wherein when the first signal corresponds to the second value, the rending unit processes the rendering according to the second position data.

In the embodiment of the invention, the graphics-processing apparatus further comprises a second checking unit. The second checking unit is configured to generate a second signal according to a second condition, wherein when the second signal corresponds to a third value computing the vertex varying of the vertex is in the binning phase, and wherein when the second signal corresponds to a fourth value computing the vertex varying of the vertex is in the rendering phase.

In the embodiment of the invention, the vertex shader chooses to process with respect to the vertex in one of the following ways, according to a third condition. The ways comprise computing the varying of the vertex and storing the varying of the vertex in the rendering phase; computing the varying of the vertex and not storing the varying of the vertex in the rendering phase; and bypass-computing the varying of the vertex In the embodiment of the invention, the first condition, second condition and third condition is input component count, output component count, primitive bounding box, primitive type, previous decision result from the same tile and same draw call, later shader stage decision, state counter from non-shader function part in GPU, memory requirement from complier, bandwidth profiling and usage information, system-level status and requirement, utilization profiling information from execution unit, power/heat index from power estimator, stored profiling data for the same program, hint sent from CPU, instancing setting, tessellation setting and parameters, geometry shader information, draw call vertex number, draw call bounding box, on-chip buffer size, input data correlation between shader stages, or external buffer usage.

Other aspects and features of the invention will become apparent to those with ordinary skill in the art upon review of the following descriptions of specific embodiments of methods and apparatus.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
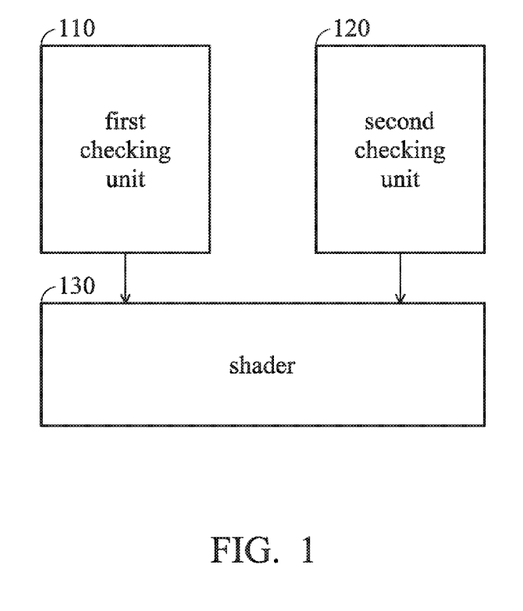
FIG. 1 is a diagram of a graphics processing apparatus 100 according to a first embodiment of the present invention.

FIG. 1 is a diagram of a graphics processing apparatus 100 according to a first embodiment of the present invention, where the graphics processing apparatus 100 may be positioned within an electronic device, and the graphics processing apparatus may comprise at least one portion (e.g. a portion or all) of the electronic device. For example, the apparatus 100 may comprise a portion of the electronic device mentioned above, and more particularly, can be at least one hardware circuit such as at least one integrated circuit (IC) within the electronic device and associated circuits thereof. In another example, the apparatus 100 can be the whole of the electronic device mentioned above. In another example, the apparatus 100 may comprise a system comprising the electronic device mentioned above, such as an audio/video playback system comprising the electronic device. Examples of the electronic device may include, but not limited to, a mobile phone (e.g. a multifunctional mobile phone), a personal digital assistant (PDA), a tablet, and a personal computer such as a laptop computer or a desktop computer.

As shown in FIG. 1, the graphics-processing apparatus 100 comprises a first checking unit 110, a second checking unit 120, and one or more shaders, which can be collectively referred to as the shader 130. For example, the aforementioned at least one shader may be implemented with a plurality of vertex shaders (VSs) arranged for playing different roles in graphics processing (or performing different shading operations). In another example, the aforementioned at least one shader may be implemented with at least one unified VS (e.g. one or more VSs) arranged for playing different roles (or performing different shading operations) when needed. In practice, the first checking unit 110, a second checking unit 120, and the aforementioned at least one shader (e.g. the shader 120) may be positioned within a graphics processing circuit such as a graphics processing unit (GPU), no matter whether the aforementioned at least one shader is implemented with the plurality of VSs or the aforementioned at least one unified VS.

According to this embodiment of the invention, the first checking unit 110 is configured to generate a first signal according to a first condition to determine whether to re-compute vertex position in the rendering phase. In an embodiment of the invention, when the first signal corresponds to a first value, the first position data obtained in the binning phase is stored into a memory unit, and when the first signal corresponds to a second value, the vertex position of the vertex in a rendering phase is computed to obtain a second position data.

According to this embodiment of the invention, the second checking unit 120 is configured to generate a second signal according to a second condition, wherein when the second signal corresponds to a third value computing the vertex varying of the vertex is in the binning phase, and wherein when the second signal corresponds to a fourth value computing the vertex varying of the vertex is in the rendering phase. When the second signal corresponds to the third value, the vertex varying of the vertex is stored into the memory unit in the binning phase. When the second signal corresponds to the fourth value and when the first signal corresponds to the first value, the first position data is stored into the memory unit.

Please note that some embodiments of the present invention may focus on interactions between VS operations, such as interactions between operations of different physical VSs or interactions between operations of different VS roles (or roles of VS) played by the same physical VS (e.g. a unified shader). Thus, some shaders described hereinafter, such as the shaders VS0, VS1, and VS2, should be interpreted based on a functional view point, and the shaders VS0, VS1, and VS2 may be directed to calculations regarding vertices. For example, the shader VS0 may be interpreted as a VS role played by a physical VS to calculate positions of a vertex according to attributes, and the shaders VS1 and VS2 may be interpreted as two VS roles played by this physical VS to calculate the varying of the vertex according to attributes, respectively. In other words, there may be only one physical VS (or only one set of physical hardware), and the one physical VS may simultaneously or time-divisionally perform operations of the VS roles VS0, VS1, and VS2, in parallel, for example.

During the progress of GPU techniques, a conventional method in the related art suggests using different physical VSs, each of which is equipped with a fixed function of VS, to perform different VS operations, and another conventional method in the related art suggests using one shader (such as a hardware circuit capable of performing different operations according to different command sets) to perform different VS operations, and therefore this one shader may be referred to as the unified VS. However, the term "unified shader" (or UX) may be frequently used in the related art, instead of the unified VS, where the unified shader may be a calculation core that is capable of simultaneously performing GPU calculations such as vertex shading, fragment shading, pixel shading, etc. Therefore, the term "shader" in some embodiments of the present invention may be directed to one or more unified shaders, based on different viewpoints, respectively.

In addition, different terms regarding operations before or during tiling may be used in the related art. Please note that the term "binning phase" in the following embodiments of the present invention may correspond to associated processing performed before tiling, and may be directed to processing data of the whole frame (e.g. the vertices of all primitives of the whole frame). In comparison with this, the term "rendering phase" in these embodiments of the present invention may correspond to associated processing performed in unit of tile. For example, a frame may comprise N tiles, and the graphics processing apparatus 100 may complete associated calculations of the binning phase (e.g. calculating the positions and varyings of all vertices on the whole frame) in one iteration, while the graphics processing apparatus 100 may need N iterations to complete associated calculations of the rendering phase (e.g. rendering all pixels within one tile corresponding to one iteration). Therefore, one physical VS (or one set of physical hardware) such as one unified shader in these embodiments may perform the calculations corresponding to the binning phase in a time interval and perform the calculations corresponding to the rendering phase in another time interval, or may even perform the calculations corresponding to the binning phase and the rendering phase simultaneously if the computation resource is sufficient. This is for illustrative purposes only, and is not meant to be a limitation of the present invention.

Figure 2:
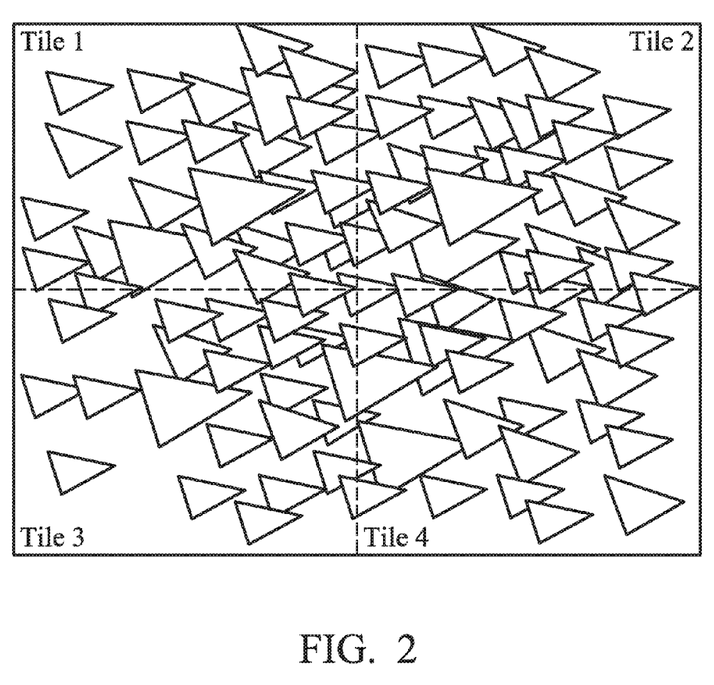
FIG. 2 illustrates at least one portion (e.g. a portion or all) of a set of vertexes to be rendered according to an embodiment of the invention.

FIG. 2 illustrates at least one portion (e.g. a portion or all) of a set of vertexes to be rendered according to an embodiment of the invention. There may be many vertexes within the set of vertexes of this embodiment. For example, the number of vertexes within this set of vertexes may be greater than one hundred. In another example, the number of vertexes within this set of vertexes may be greater than one thousand. In some examples, the number of vertexes within this set of vertexes may be greater than ten thousand. Please note that the vertexes of this embodiment may have small sizes, and most of these vertexes may touch only one tile of the plurality of tiles Tile1, Tile2, Tile3, and Tile4.

Figure 3:
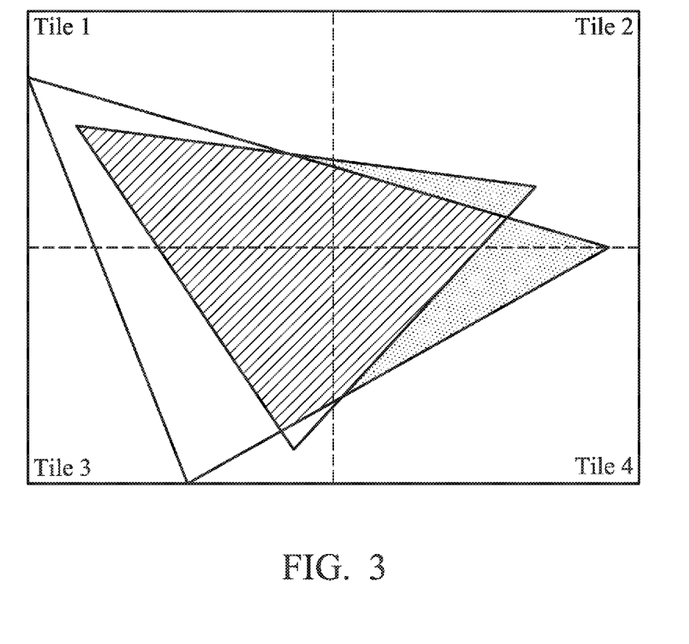
FIG. 3 illustrates at least one portion (e.g. a portion or all) of another set of vertexes to be rendered according to an embodiment of the invention.

FIG. 3 illustrates at least one portion (e.g. a portion or all) of another set of vertexes to be rendered according to an embodiment of the invention. The number of vertexes within the set of vertexes of the embodiment shown in FIG. 3 may be much less than the number of vertexes within the set of vertexes of the embodiment shown in FIG. 2. Please note that one or more vertexes within the set of vertexes of this embodiment may have large size(s), and may touch most of the plurality of tiles Tile1, Tile2, Tile3, and Tile4, such as all of the plurality of tiles Tile1, Tile2, Tile3, and Tile4.

Figure 4:
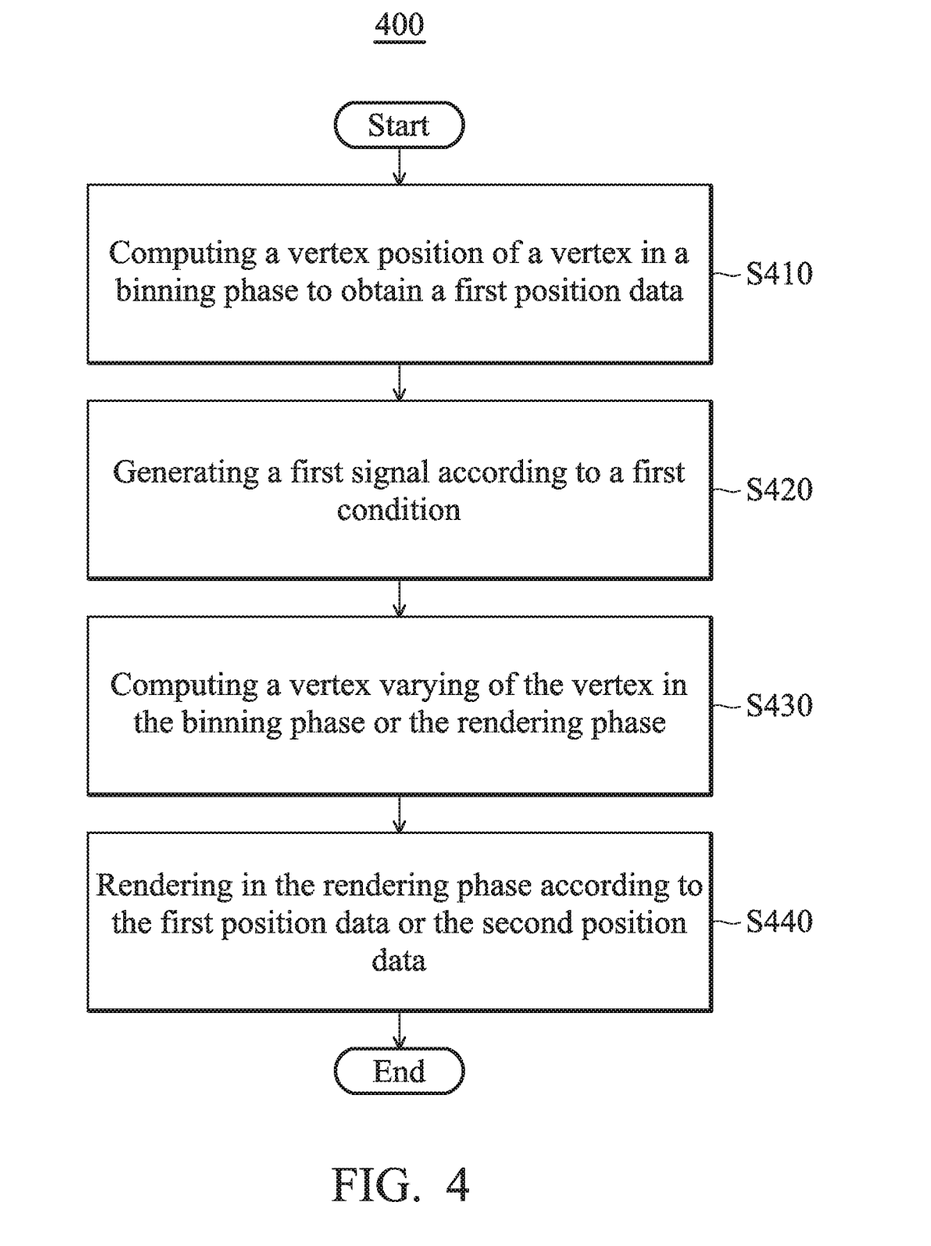
FIG. 4 is a flow chart illustrating the graphics-processing method 400 of a graphics-processing unit (GPU) according to an embodiment of the invention.

FIG. 4 is a flow chart illustrating the graphics-processing method 400 of a graphics-processing unit (GPU) according to an embodiment of the invention. The graphics-processing method is applied to the graphics-processing apparatus 100 shown in FIG. 1. The graphics processing method can be described as follows.

First, in step S410, the graphics-processing apparatus 100 computes a vertex position of a vertex in a binning phase to obtain a first position data. In step S420, the graphics-processing apparatus 100 generates a first signal according to a first condition, wherein when the first signal corresponds to a first value, the first position data is stored into a memory unit, and when the first signal corresponds to a second value, the vertex position of the vertex in a rendering phase is computed to obtain a second position data.

Simply speaking, the proposed method obtains the position data in the rendering phase or the binning phase according to the first condition. Although the computation loading of the graphics-processing apparatus 100 may increase accordingly when the position data is computed in the rendering phase, the bandwidth between the graphics-processing apparatus 100 and a memory can be significantly reduced especially when the number of objects to be processed is great, such as the tile 1 in FIG. 2. In this embodiment, the first condition comprises at least one of the following criteria: input component count, output component count, primitive bounding box, primitive type, previous decision result from the same tile and same draw call, later shader stage decision, state counter from non-shader function part in GPU, memory requirement from complier, bandwidth profiling and usage information, system-level status and requirement, utilization profiling information from execution unit, power/heat index from power estimator, stored profiling data for the same program, hint sent from CPU, instancing setting, tessellation setting and parameters, geometry shader information, draw call vertex number, draw call bounding box, on-chip buffer size, input data correlation between shader stages, and external buffer usage, and other criteria. Table 1 provides a detailed description of the criteria.

TABLE 1

| Criteria | Description |
| --- | --- |
| input component count | For each shader execution, the input must be read once. |
| output component count | If memory is output to DRAM, the output will be accessed according to the usage times. |

TABLE 1-continued

| Criteria | Description |
| --- | --- |
| primitive bounding box | Primitive bounding box directly affects the usage times at rendering phase. It may be explicitly set from the API/shader program or be derived from fixed function pipeline. |
| primitive type | Different primitive types have a specific bounding box range. Some primitive types may have extra component code addressing. |
| previous decision result from the same tile and same draw call | With previous decision result, we may calculate the overhead from fragmentation from tiling order. With this information, we may better approach the optimal criteria for the current primitive. |
| later shader stage decision result (i.e. VS1/2 selection) | If later shader stage is done at rendering phase, VS0 can combine the later stage to reduce overhead. |
| state counter from non-shader function part in GPU | According to non-shader function pipeline and buffer management (Ex: FIFO/buffer usage, Z test/clipping result and statistics, cache hit rate), we may change the decision to avoid some bottleneck from non-shader functional units. |
| Memory requirement from compiler | With more memory requirements, the latency will be higher due to limited memory bandwidth. |
| bandwidth profiling and usage information | If GPU memory bandwidth usage is low, we may favor computation more. |
| System-level status and requirement | If system memory interface is busy, we may prefer the configuration with less bandwidth even with much higher loading in execution unit. Also, GPU may adjust its preference on bandwidth or power according to system requirements. |
| Utilization profiling information from execution unit | If execution unit is mostly idle, more computation will not impact performance. We may check if the computation overhead raises over the idle time; if not, we may just ignore the computation overhead impact. |
| power/heat index from power estimator | If power or heat rise above a threshold, it may hurt battery or hurt system performance. On-chip computation and off-chip bandwidth contribute to power in some proportion and need to be optimized at whole chip level. |
| stored profiling data for the same program | The optimal criteria may differ from application to application due to method of usage. Since driver may know current application, we may store a per-application profiling data and use the data to apply "Profile Guided Optimization." |
| hint sent from CPU | GPU may provide a method/API for driver or application to give GPU a hint, according to requirements. |
| instancing setting | If instancing is on, more information is required to store to external buffer, and complex divisor function management is required. The overhead should also be considered. |
| tessellation setting and parameters | If tessellation is on, it is expected that many more primitives are generated and may highly affect bandwidth and computation. The tessellation results should be considered. |
| geometry shader information | Since number of primitives emitted by geometry shader is decided at run-time, we may not know how many primitives are to be emitted. If geometry shader emits many primitives, it may impact the bandwidth, and need to take care. We may do this by enabling of geometry shader, compiler information, or profiling. |
| draw call vertex number | If a draw call has many vertices, it is likely the fragmentation of redo VS0 at rendering phase is lower. |
| draw call bounding box | If a draw call has large bounding box, it is likely the vertices are sparse and have higher performance impact on redo VS0. |
| on-chip buffer size | If some on-chip buffer size alters, data spilling may occur and buffer utilization should be constrained. Also, bandwidth should also be more constrained in this case. |
| input data correlation between shader stages | If input data between shader stages has higher correlation in its address, the bandwidth and latency could be reduced due to data locality and may be covered by fewer large memory access bursts. As a result, it more favorable to do together |
| external buffer usage | If the external buffer is nearly full at binning phase, it is unfavorable to store more data into it. In this case, we should make storing to it with higher costs. If the buffer is full, we should stop storing any output and redo VS0 at rendering phase. |

The first condition is determined according to at least one of the described criteria. Take the term "external buffer usage" for example. As the description disclosed, the external buffer is nearly full at binning phase, it is unfavorable to store more data into it. Therefore, the position data computed by the shader VS0 is not transmitted to the memory, and the shader VS0 is redo (performed again) in the rendering phase, and the generated position data, the second position data, is provided to other shader, such as shader VS2.

Take the term "bandwidth profiling and usage information" for example. If the bandwidth usage is low, i.e., the bandwidth is not sufficient for transmitting the position data generated by the shader VS0 in the binning phase, it is favorable to re-compute the position data in the rendering phase to save the bandwidth.

Furthermore, take the term "input component count" for example. The input component count is read in each shader process, and when the input component count is greater than a threshold, it implies that the amount of the corresponding position data is great, and the transmission of the position data may occupy too large bandwidth. Thus, it is favorable to re-compute the position data in the rendering phase to save the bandwidth.

Although the remaining criteria are not discussed above, it is easily to understand for a person skilled in the art to set the requirement of the first condition.

In step S430, the graphics-processing apparatus 100 computes a vertex varying of the vertex in the binning phase or the rendering phase. In one embodiment, when the second condition is met, the vertex varying is computing in the binning phase, and when the second condition is not met, the vertex varying is computing in the rendering phase. In another embodiment, the vertex varying is computing only in the rendering phase, but the vertex varying required in the rendering phase may be the vertex varying generated from a pre-operation. When the third condition is met, the vertex varying required in the rendering phase is from a pre-operation. When the third condition is not met, the vertex varying required in the rendering phase is computed in the current operation. In step S440, the graphics-processing apparatus 100 renders in the rendering phase according to the first position data or the second position data, wherein when the first signal corresponds to the first value, the rendering is according to the first position data generated in the binning phase, and wherein when the first signal corresponds to the second value, the rendering is according to the second position data in the rendering phase. In other words, when the first signal corresponds to the first value, the operation of shader VS0 will not re-do in the rendering phase, and when the first signal corresponds to the second value, the operation of shader VS0 will re-do in the rendering phase. Note that when the operation of shader VS0 is re-done in the rendering phase, the first position data will not be transmitted to the memory buffer.

Although only the first condition is mentioned in the method 400 for improving performance of the graphics-processing apparatus 100, more conditions can be set in the proposed innovation to improve the performance of the graphics-processing apparatus 100, and will be discussed in the following embodiments.

Figure 5:
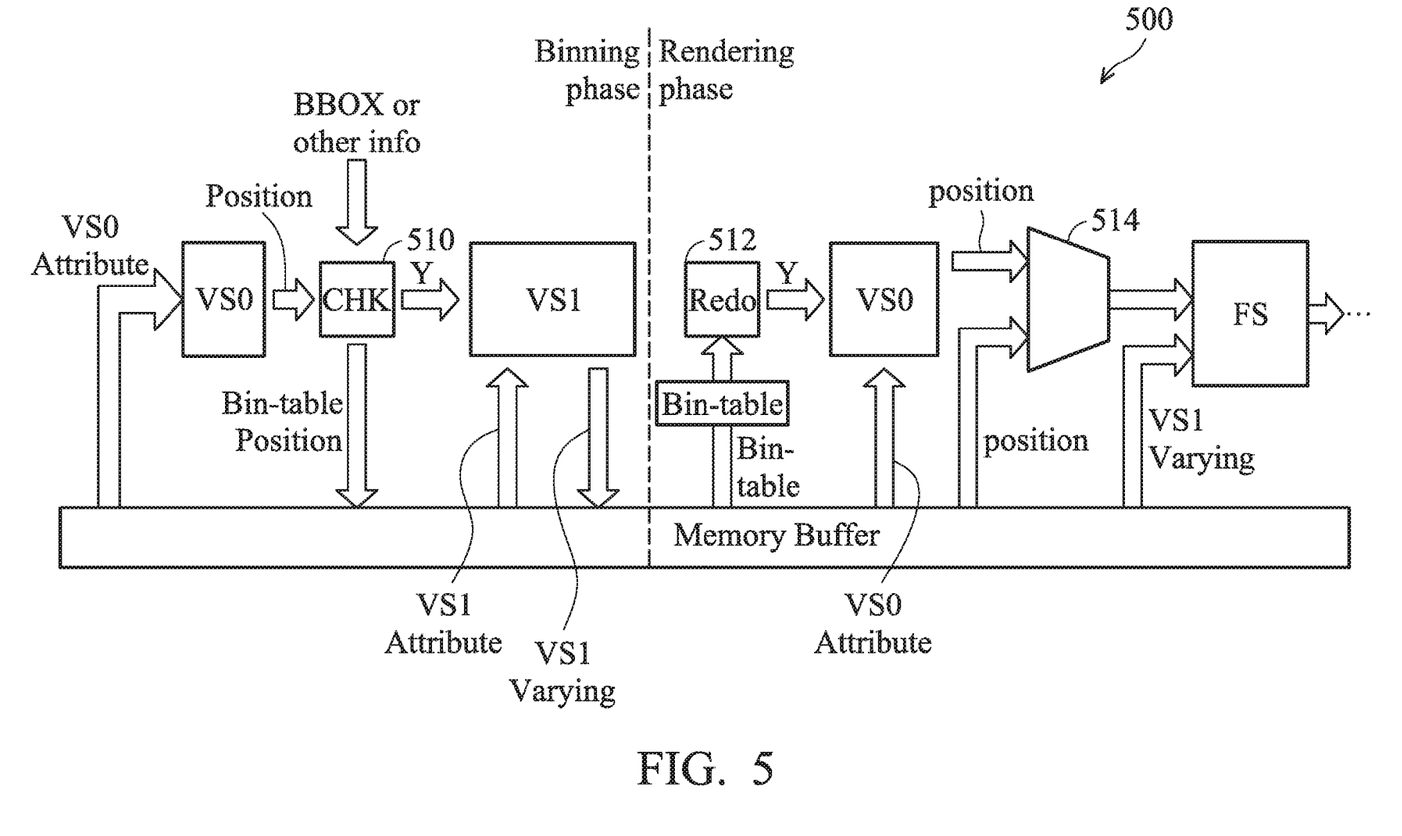
FIG. 5 illustrates an adaptive vertex shading control scheme involved with the graphics processing method 400 shown in FIG. 4 according to an embodiment of the present invention.

FIG. 5 illustrates an adaptive vertex shading control scheme involved with the graphics processing method 400 shown in FIG. 4 according to an embodiment of the present invention. For example, the architecture 500 shown in FIG. 5 may be arranged for performing adaptive vertex shading scheduling in a graphics processing pipeline, such as a TBR pipeline, etc., where the graphics processing pipeline may be a GPU pipeline. For better comprehension, the left half of FIG. 5 is labeled "Binning phase", and the right half of FIG. 5 is labeled "Rendering phase". This is for illustrative purposes only, and is not meant to be a limitation of the present invention.

As shown in FIG. 5, the architecture 500 may comprise a set of shaders {VS0, VS1, FS} and a checking unit 510, a redo determination unit 512, a multiplexing unit 514. In FIG. 5, the functional blocks may represent a physical circuit, data, a program executed by a processor, or a subroutine executed by the processor. In one embodiment, the set of shaders are program, algorithm, or the same computational engine implemented by the same unified shader in different scheduling, the shaders may be merged to be run together.

According to this embodiment, the set of shaders {VS0, VS1, FS} may play a plurality of roles in the graphics processing pipeline, respectively, to complete the rendering result(s) of the rendering operation.

The shader VS0 may be arranged for loading some attributes (which can be referred to as the VS0 attributes in this example) of the primitive, and performing position processing to generate positions of the vertices of the primitive. The shader VS1 may be arranged for loading some attributes (which can be referred to as the VS1 attributes in this example) such as some inputs for the shader VS1, and computing some varyings and outputting these varyings (which can be referred to as the VS1 varyings in this example), where these varyings can be taken as an example of the vertex varyings computed in the binning phase.

The shader FS may be arranged for performing fragment shading according to the inputs thereof (e.g. the varyings received by one of the two input of the multiplexing circuit 514, such as the position data, labeled as Position in FIG. 5, from the shader VS0 in the rendering phase or the position data from the shader VS0 in the binning phase via memory bus) to generate some fragment shading results, and outputting these fragment shading results to a shader Post (not shown in FIG. 5) for performing post processing to complete the rendering result(s) of the rendering operation.

The checking unit 510 determines whether a first condition is met. The detail of the first condition can be referred to the method 400, Table 1 and corresponding paragraphs. The determination result of the checking unit 510 controls the operation of the multiplexing unit 514 and Redo unit 512. When the checking unit 510 determines that the first condition is met, the position data generated by the shader VS0 in the binning phase is not transmitted to the memory, and the Redo unit 512 informs the shader VS0 in the rendering phase to re-compute the position data according to the VS0 attribute. Then, the multiplexing unit 514 receives and outputs the position data from the shader VS0 in the rendering phase to the shader FS. If the checking unit 510 determines that the first condition is not met, the position data generated by the shader VS0 in the binning phase is transmitted to the memory, and then the multiplexing unit 514 receives and outputs the position data from the shader VS0 in the binning phase to the shader FS.

Figure 6:
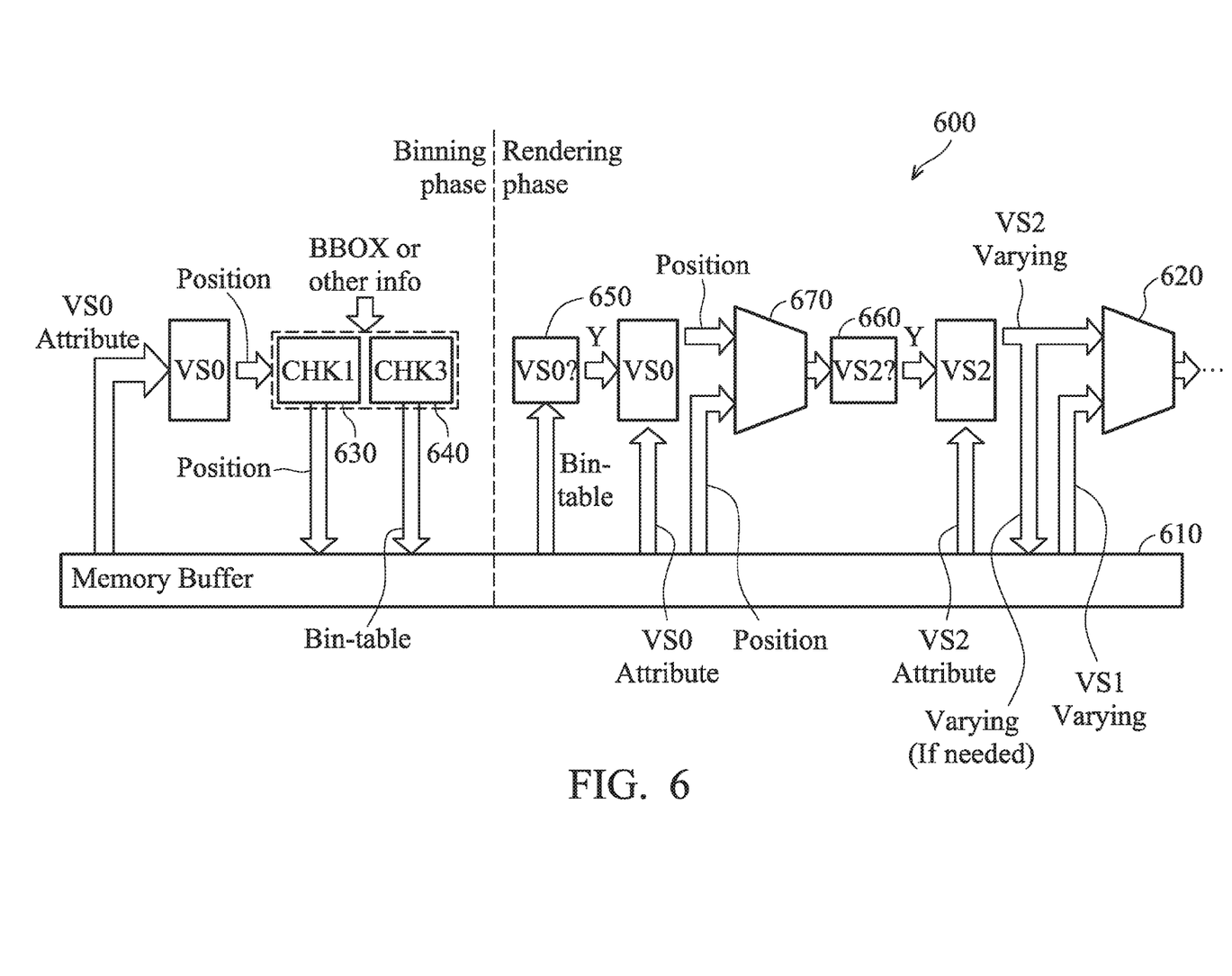
FIG. 6 illustrates an adaptive vertex shading control scheme involved with the graphics processing method according to an embodiment of the present invention.

FIG. 6 illustrates an adaptive vertex shading control scheme involved with the graphics processing method according to an embodiment of the present invention. The architecture 600 shown in FIG. 6 may be arranged for performing adaptive vertex shading scheduling in a graphics processing pipeline, such as a TBR pipeline, etc., where the graphics processing pipeline may be a GPU pipeline. For better comprehension, the left half of FIG. 6 is labeled "Binning phase", and the right half of FIG. 6 is labeled "Rendering phase". This is for illustrative purposes only, and is not meant to be a limitation of the present invention.

As shown in FIG. 6, the architecture 600 may comprise a set of shaders {VS0, VS2, FS}, a memory buffer 610, a second multiplexing unit 620, a first checking unit 630, a second checking unit 640, a redo determination unit 650, a determination unit 660, and a first multiplexing unit 670. In FIG. 6, the functional blocks may represent a physical circuit, data, a program executed by a processor, or a subroutine executed by the processor. In one embodiment, the set of shaders are program, algorithm, or the same computational engine implemented by the same unified shader in different scheduling, the shaders may be merged to be run together.

According to this embodiment, the set of shaders {VS0, VS2} may play a plurality of roles in the graphics processing pipeline, respectively, to complete the rendering result(s) of the rendering operation.

The shader VS0 may be arranged for loading some attributes (which can be referred to as the VS0 attributes in this example) of the primitive, and performing position processing to generate positions of the vertices of the primitive. The shader VS2 may be arranged for loading some attributes (which can be referred to as the VS2 attributes in this example) such as some inputs for the shader VS2, and computing some varyings and outputting these varyings (which can be referred to as the VS2 varyings in this example)

The first checking unit 630 determines whether a first condition for the shader VS0 is met. The detail of the first condition can be referred to the method 400, Table 1 and corresponding paragraphs. The third checking unit 640 determines whether a third condition for the shader VS2 is met. The detail of the third condition can also be referred to the Table 1 and corresponding paragraphs. In this embodiment, the determination result of the first checking unit 630 controls the operation of the first multiplexing unit 670 and the redo determination unit 650, and the determination result of the third checking unit 640 controls the operation of the second multiplexing unit 620 and determination unit 660. The first multiplexing unit 670 has two inputs for receiving position data generated by the shader VS0 in the binning phase and the position data generated by the shader VS0 in the rendering phase. In practice, only one shader VS0 is activated and operated, and only one input of the first multiplexing unit 670 receives position data. The first multiplexing unit 670 outputs the position data from the shader VS0 in the rendering phase or the shader VS0 from the binning phase according to the determination result of the first checking unit 630.

The second multiplexing unit 620 has two inputs for receiving VS2 varying generated by the shader VS2 and VS1 varying generated in a previous operation. The second multiplexing unit 620 is controlled by the determination result of the third checking unit 640 to output the VS2 varying or the VS1 varying. When the third condition is met, the second multiplexing unit 620 output the VS1 varying, and when the third is not met, the second multiplexing unit 620 output the VS2 varying.

The first checking unit 630 generates a first signal according to the first condition. When the first signal corresponds to a first value, the first position data is stored into the memory buffer 610, and the redo determination unit 650 disables the shader VS0 in the rendering phase, and the first multiplexing unit 670 outputs the position data generated by the shader VS0 in the binning phase. When the first signal corresponds to a second value, the position data generated by the shader VS0 in the binning phase is not transmitted to the memory buffer 610, and only the bin-table is transmitted to the memory buffer 610.

The third checking unit 640 generates a third signal according to a third condition. When the third signal corresponds to a third value, the vertex varying of the vertex output by the second multiplexing unit 620 is generated by the shader VS2. When the third signal corresponds to the fourth value, the vertex varying of the vertex output by the second multiplexing unit 620 is the vertex varying generated in a previous operation, such as the VS1 varying.

Take FIG. 3 for example. The triangles on FIG. 3 is crossed in tiles 1~4. When the vertex varying of the vertex of the triangle is computed in tile 1, the vertex varying can also be applied in operation for tiles 2~4. Therefore, the second multiplexing unit 620 output the VS1 varying when the third condition is met.

When the position data generated by the shader VS0 in the binning phase is not stored in the memory buffer 610, the redo determination unit 650 informs the shader VS0 in the rendering phase to calculate the position data according to the received VS0 attribute. Then, the first multiplexing unit 670 outputs the position data generated by the shader VS0 in the rendering phase.

In one embodiment, the determination unit 660 determines whether the shader VS2 to be activated. If yes, shader VS2 generates VS varying according to the VS2 attribute and the position data from the first multiplexing unit 670. The second multiplexing unit 620 outputs one of the VS1 varying and the VS2 varying for further processing.

Figure 7:
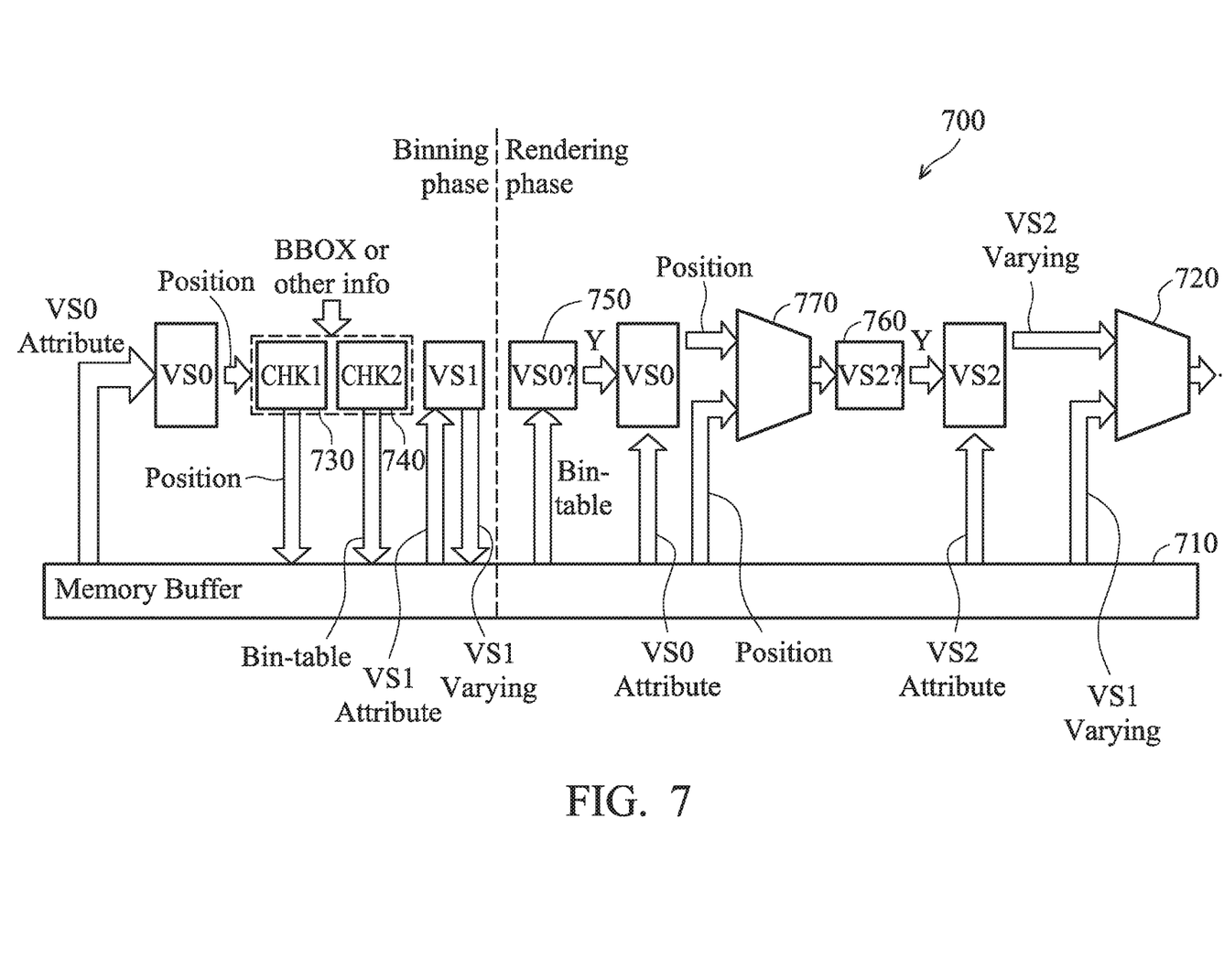
FIG. 7 illustrates an adaptive vertex shading control scheme involved with the graphics processing method according to an embodiment of the present invention.

FIG. 7 illustrates an adaptive vertex shading control scheme involved with the graphics processing method according to an embodiment of the present invention. The architecture 700 shown in FIG. 7 may be arranged for performing adaptive vertex shading scheduling in a graphics processing pipeline, such as a TBR pipeline, etc., where the graphics processing pipeline may be a GPU pipeline. For better comprehension, the left half of FIG. 7 is labeled "Binning phase", and the right half of FIG. 7 is labeled "Rendering phase". This is for illustrative purposes only, and is not meant to be a limitation of the present invention.

As shown in FIG. 7, the architecture 700 may comprise a set of shaders {VS0, VS1, VS2}, a memory buffer 710, a second multiplexing unit 720, a first checking unit 730, a second checking unit 740, a redo determination unit 750, a determination unit 760, and a first multiplexing unit 770. In FIG. 7, the functional blocks may represent a physical circuit, data, a program executed by a processor, or a subroutine executed by the processor. In one embodiment, the set of shaders are program, algorithm, or the same computational engine implemented by the same unified shader in different scheduling, the shaders may be merged to be run together.

According to this embodiment, the set of shaders {VS0, VS1, VS2} may play a plurality of roles in the graphics processing pipeline, respectively, to complete the rendering result(s) of the rendering operation.

The shader VS0 may be arranged for loading some attributes (which can be referred to as the VS0 attributes in this example) of the primitive, and performing position processing to generate positions of the vertices of the primitive. The shader VS1 may be arranged for loading some attributes (which can be referred to as the VS1 attributes in this example) such as some inputs for the shader VS1, and computing some varyings and outputting these varyings (which can be referred to as the VS1 varyings in this example), where these varyings can be taken as an example of the vertex varyings computed in the binning phase. The shader VS2 may be arranged for loading some attributes (which can be referred to as the VS2 attributes in this example) such as some inputs for the shader VS2, and computing some varyings and outputting these varyings (which can be referred to as the VS2 varyings in this example).

The first checking unit 730 determines whether a first condition for the shader VS0 is met. The detail of the first condition can be referred to the method 400, Table 1 and corresponding paragraphs. The second checking unit 740 determines whether a second condition for the shader VS2 is met. The detail of the second condition can also be referred to, Table 1 and corresponding paragraphs. In this embodiment, the determination result of the first checking unit 730 controls the operation of the first multiplexing unit 770 and the redo determination unit 750. The first multiplexing unit 770 has two inputs for receiving position data generated by the shader VS0 in the binning phase and the position data generated by the shader VS0 in the rendering phase. In practice, only one shader VS0 is activated and operated, and only one input of the first multiplexing unit 770 receives position data.

In this embodiment, the determination result of the second checking unit 740 controls the operations of the second multiplexing unit 720 and determination unit 760. The second checking unit 740 determines whether the vertex varying output by the second multiplexing unit 720 is generated by the shader VS1 or the shader VS2. The second checking unit 740 generates the second signal according to a second condition. When the second signal corresponds to a third value, the vertex varying of the vertex is computed by the shader VS1 and the second multiplexing unit 720 output the VS1 varying. When the second signal corresponds to a fourth value, the vertex varying of the vertex is computed by the shader VS2 and the second multiplexing unit 720 output the VS2 varying. In one embodiment, only one of the shaders VS1 and VS2 is activated during one rendering operation. It means that when the shader VS1 is activated, the shader VS2 is de-activated, or when the shader VS2 is activated, the shader VS1 is de-activated. In other words, the second multiplexing unit 720 receives only one of the VS1 varying and the VS2 varying.

The first checking unit 730 generates a first signal according to the first condition. When the first signal corresponds to a first value, the first position data is stored into the memory buffer 710, and the redo determination unit 750 disables the shader VS0 in the rendering phase, and the first multiplexing unit 770 outputs the position data generated by the shader VS0 in the binning phase. When the first signal corresponds to a second value, the position data generated by the shader VS0 in the binning phase is not transmitted to the memory buffer 710, and only the bin-table is transmitted to the memory buffer 710.

When the position data generated by the shader VS0 in the binning phase is not stored in the memory buffer 710, the redo determination unit 750 informs the shader VS0 in the rendering phase to calculate the position data according to the received VS0 attribute. Then, the first multiplexing unit 770 outputs the position data generated by the shader VS0 in the rendering phase.

The determination unit 760 determines whether the shader VS2 to be activated. If yes, shader VS2 generates VS2 varying according to the VS2 attribute and the position data from the first multiplexing unit 770 and the VS2 varying generated by VS2 is selected by the second multiplexing unit 720 for further processing. The second multiplexing unit 720 outputs one of the VS1 varying and the VS2 varying for further processing.

Figure 8:
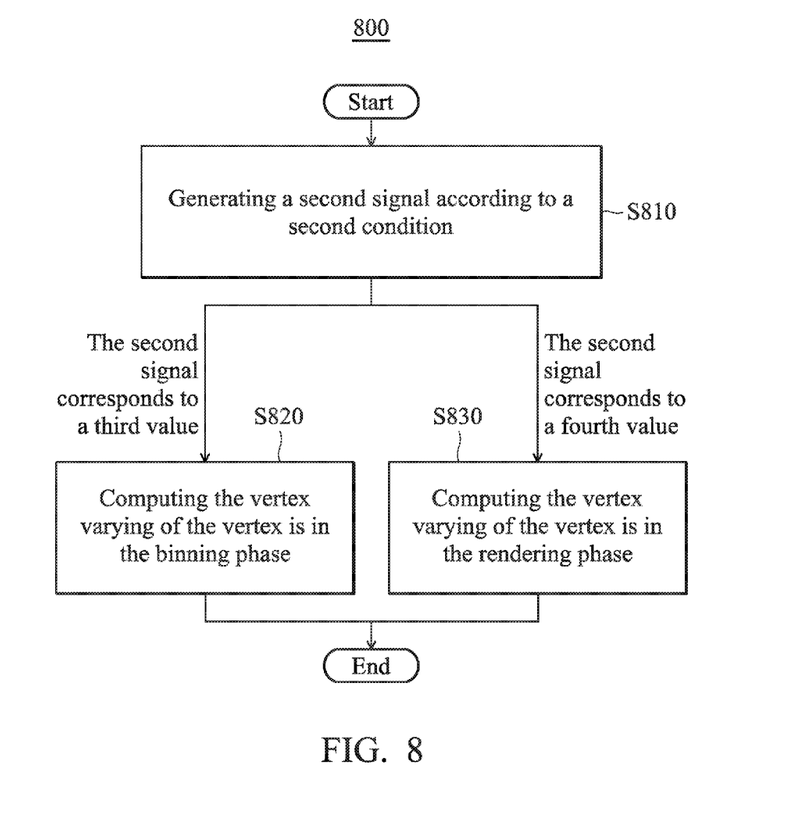
FIG. 8 illustrates an adaptive vertex shading control scheme involved with the graphics processing method according to an embodiment of the present invention.

FIG. 8 is a flow chart illustrating the graphics-processing method 800 of a graphics-processing unit (GPU) according to another embodiment of the invention. The graphics-processing method is applied to the graphics-processing apparatus 100. In step S810, the graphics-processing apparatus 100 generates a second signal according to a second condition. When the second signal corresponds to a third value, step 820 is performed. In step S820, the graphics-processing apparatus 100 computes the vertex varying of the vertex is in the binning phase. When the second signal corresponds to a fourth value, step 830 is performed. In step S830, the graphics-processing apparatus 100 computes the vertex varying of the vertex is in the rendering phase.

In an embodiment of the graphics-processing method 800, the first condition is input component count, output component count, primitive bounding box, primitive type, previous decision result from the same tile and same draw call, later shader stage decision, state counter from non-shader function part in GPU, memory requirement from complier, bandwidth profiling and usage information, system-level status and requirement, utilization profiling information from execution unit, power/heat index from power estimator, stored profiling data for the same program, hint sent from CPU, instancing setting, tessellation setting and parameters, geometry shader information, draw call vertex number, draw call bounding box, on-chip buffer size, input data correlation between shader stages, or external buffer usage.

In an embodiment of the graphics-processing method 800, when the second signal corresponds to the third value, the graphics-processing apparatus 100 will store the vertex varying of the vertex in the binning phase. In an embodiment of the graphics-processing method 800, when the second signal corresponds to the fourth value and when the first signal corresponds to the first value, the graphics-processing apparatus 100 will store the first position data into the memory unit.

Figure 9:
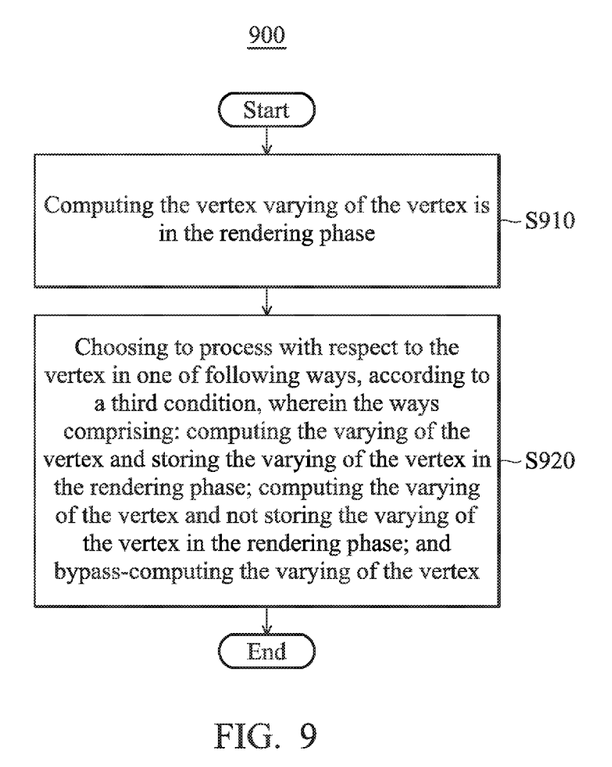
FIG. 9 is a flow chart illustrating the graphics-processing method 900 of a graphics-processing unit (GPU) according to another embodiment of the invention.

FIG. 9 is a flow chart illustrating the graphics-processing method 900 of a graphics-processing unit (GPU) according to another embodiment of the invention. The graphics-processing method is applied to the graphics-processing apparatus 100. In step S910, the graphics-processing apparatus 100 only compute the vertex varying of the vertex is in the rendering phase. In step S920, the graphics-processing apparatus 100 chooses to process with respect to the vertex in one of following ways, according to a third condition, wherein the ways comprising: computing the varying of the vertex and storing the varying of the vertex in the rendering phase; computing the varying of the vertex and not storing the varying of the vertex in the rendering phase; and bypass-computing the varying of the vertex.

In an embodiment of the graphics-processing method 900, the third condition is input component count, output component count, primitive bounding box, primitive type, previous decision result from the same tile and same draw call, later shader stage decision, state counter from non-shader function part in GPU, memory requirement from complier, bandwidth profiling and usage information, system-level status and requirement, utilization profiling information from execution unit, power/heat index from power estimator, stored profiling data for the same program, hint sent from CPU, instancing setting, tessellation setting and parameters, geometry shader information, draw call vertex number, draw call bounding box, on-chip buffer size, input data correlation between shader stages, or external buffer usage.

The detail of the third condition can be referred to the method 400, Table 1 and corresponding paragraphs.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a non-transitory computer-readable medium comprising codes relating to one or more of the aspects of the disclosure. In some aspects, a computer software product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A graphics-processing method of a graphics-processing unit (GPU), comprising:
   computing a vertex position of a vertex in a binning phase to obtain a first position data;
   generating a first signal according to a first condition, wherein when the first signal corresponds to a first value, the first position data is stored into a memory unit, and when the first signal corresponds to a second value, the vertex position of the vertex is computed in a rendering phase to obtain a second position data;
   computing a vertex varying of the vertex in the binning phase or the rendering phase; and
   rendering in the rendering phase according to the first position data or the second position data, wherein when the first signal corresponds to the first value, the rendering is according to the first position data, and wherein when the first signal corresponds to the second value, the rendering is according to the second position data.

2. The graphics-processing method of claim 1, wherein the first condition is input component count, output component count, primitive bounding box, primitive type, previous decision result from the same tile and same draw call, later shader stage decision, state counter from non-shader function part in GPU, memory requirement from complier, bandwidth profiling and usage information, system-level status and requirement, utilization profiling information from execution unit, power/heat index from power estimator, stored profiling data for the same program, hint sent from CPU, instancing setting, tessellation setting and parameters, geometry shader information, draw call vertex number, draw call bounding box, on-chip buffer size, input data correlation between shader stages, or external buffer usage.

3. The graphics-processing method of claim 1, further comprising:
   generating a second signal according to a second condition, wherein when the second signal corresponds to a third value computing the vertex varying of the vertex is in the binning phase, and wherein when the second signal corresponds to a fourth value computing the vertex varying of the vertex is in the rendering phase.

4. The graphics-processing method of claim 3, wherein the second condition is input component count, output component count, primitive bounding box, primitive type, previous decision result from the same tile and same draw call, later shader stage decision, state counter from non-shader function part in GPU, memory requirement from complier, bandwidth profiling and usage information, system-level status and requirement, utilization profiling information from execution unit, power/heat index from power estimator, stored profiling data for the same program, hint sent from CPU, instancing setting, tessellation setting and parameters, geometry shader information, draw call vertex number, draw call bounding box, on-chip buffer size, input data correlation between shader stages, or external buffer usage.

5. The graphics-processing method of claim 3, wherein when the second signal corresponds to the third value, the vertex varying of the vertex is stored in the binning phase.

6. The graphics-processing method of claim 3, wherein when the second signal corresponds to the fourth value and when the first signal corresponds to the first value, the first position data is stored into the memory unit.

7. The graphics-processing method of claim 1, further comprising:
   computing the vertex varying of the vertex is in the binning phase, wherein the first position data is stored into the memory unit when the first signal corresponds to the first value and the vertex varying of the vertex is stored in the binning phase.

8. The graphics-processing method of claim 1, wherein computing the vertex varying of the vertex is only in the rendering phase.

9. The graphics-processing method of claim 8, further comprising:
   choosing to process with respect to the vertex in one of the following ways, according to a third condition, wherein the ways comprise:
   computing the varying of the vertex and storing the varying of the vertex in the rendering phase;
   computing the varying of the vertex and not storing the varying of the vertex in the rendering phase; and
   bypass-computing the varying of the vertex.

10. The graphics-processing method of claim 9, wherein the third condition is input component count, output component count, primitive bounding box, primitive type, previous decision result from the same tile and same draw call, later shader stage decision, state counter from non-shader function part in GPU, memory requirement from complier, bandwidth profiling and usage information, system-level status and requirement, utilization profiling information from execution unit, power/heat index from power estimator, stored profiling data for the same program, hint sent from CPU, instancing setting, tessellation setting and parameters, geometry shader information, draw call vertex number, draw call bounding box, on-chip buffer size, input data correlation between shader stages, or external buffer usage.

11. A graphics-processing apparatus, comprising:
   at least one vertex shader, configured to compute a vertex position of a vertex in a binning phase to obtain a first position data and compute a vertex varying of the vertex in the binning phase or the rendering phase;
   a first checking unit, configured to generate a first signal according to a first condition, wherein when the first signal corresponds to a first value, the first position data is stored into a memory unit, and when the first signal corresponds to a second value, the vertex position of the vertex in a rendering phase is computed to obtain a second position data; and
   a rending unit, configured to render in the rendering phase according to the first position data or the second position data, wherein when the first signal corresponds to the first value, the rending unit processes rendering according to the first position data, and wherein when the first signal corresponds to the second value, the rending unit processes the rendering according to the second position data.

12. The graphics-processing apparatus of claim 11, wherein the first condition is input component count, output component count, primitive bounding box, primitive type, previous decision result from the same tile and same draw call, later shader stage decision, state counter from non-shader function part in GPU, memory requirement from complier, bandwidth profiling and usage information, system-level status and requirement, utilization profiling information from execution unit, power/heat index from power estimator, stored profiling data for the same program, hint sent from CPU, instancing setting, tessellation setting and parameters, geometry shader information, draw call vertex number, draw call bounding box, on-chip buffer size, input data correlation between shader stages, or external buffer usage.

13. The graphics-processing apparatus of claim 11, further comprising:
   a second checking unit, configured to generate a second signal according to a second condition, wherein when the second signal corresponds to a third value computing the vertex varying of the vertex is in the binning phase, and wherein when the second signal corresponds to a fourth value computing the vertex varying of the vertex is in the rendering phase.

14. The graphics-processing apparatus of claim 13, wherein the second condition is input component count, output component count, primitive bounding box, primitive type, previous decision result from the same tile and same draw call, later shader stage decision, state counter from non-shader function part in GPU, memory requirement from complier, bandwidth profiling and usage information, system-level status and requirement, utilization profiling information from execution unit, power/heat index from power estimator, stored profiling data for the same program, hint sent from CPU, instancing setting, tessellation setting and parameters, geometry shader information, draw call vertex number, draw call bounding box, on-chip buffer size, input data correlation between shader stages, or external buffer usage.

15. The graphics-processing apparatus of claim 13, wherein when the second signal corresponds to the third value, the vertex varying of the vertex is stored into the memory unit in the binning phase.

16. The graphics-processing apparatus of claim 13, wherein when the second signal corresponds to the fourth value and when the first signal corresponds to the first value, the first position data is stored into the memory unit.

17. The graphics-processing apparatus of claim 11, wherein the vertex shader computes the vertex varying of the vertex in the binning phase, wherein the first position data is stored into the memory unit when the first signal corresponds to the first value; and the vertex varying of the vertex is stored into the memory unit in the binning phase.

18. The graphics-processing apparatus of claim 11, wherein the vertex shader computes the vertex varying of the vertex is only in the rendering phase.

19. The graphics-processing apparatus of claim 18, wherein the vertex shader chooses to process with respect to the vertex in one of the following ways, according to a third condition, wherein the ways comprise:
   computing the varying of the vertex and storing the varying of the vertex in the rendering phase;
   computing the varying of the vertex and not storing the varying of the vertex in the rendering phase; and
   bypass-computing the varying of the vertex.

20. The graphics-processing method of claim 19, wherein the third condition is input component count, output component count, primitive bounding box, primitive type, previous decision result from the same tile and same draw call, later shader stage decision, state counter from non-shader function part in GPU, memory requirement from complier, bandwidth profiling and usage information, system-level status and requirement, utilization profiling information from execution unit, power/heat index from power estimator, stored profiling data for the same program, hint sent from CPU, instancing setting, tessellation setting and parameters, geometry shader information, draw call vertex number, draw call bounding box, on-chip buffer size, input data correlation between shader stages, or external buffer usage.

* * * * *